Sept. 20, 1955           J. LATZEN           2,718,418
BALL AND SOCKET JOINT FOR STEERING
RODS OF MOTOR VEHICLES
Filed Aug. 15, 1950
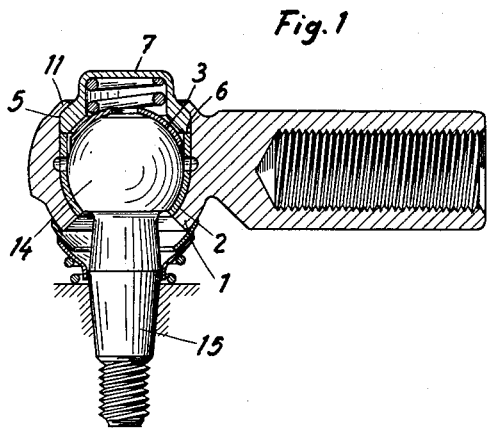
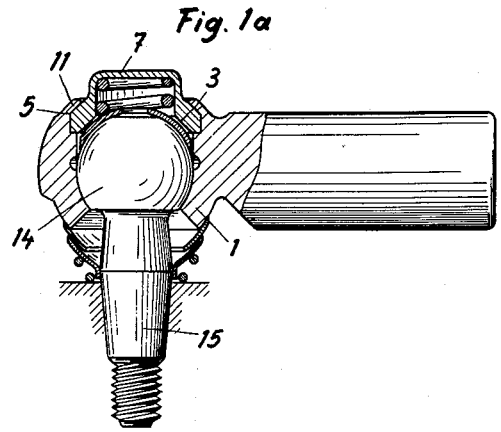
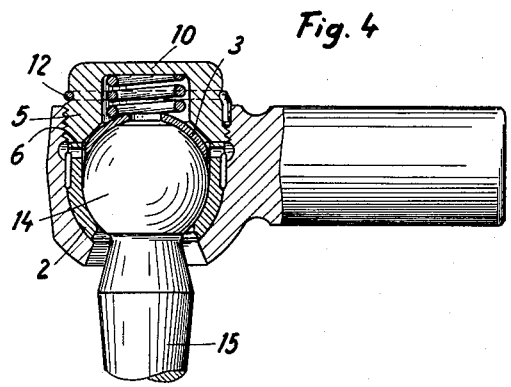
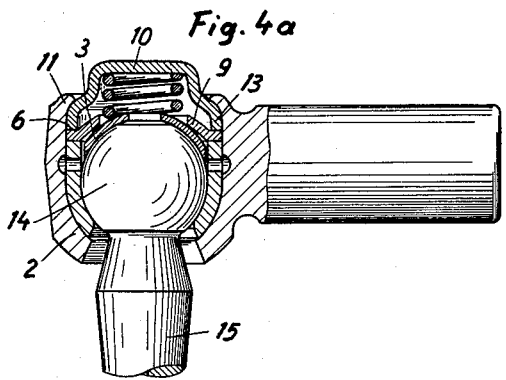
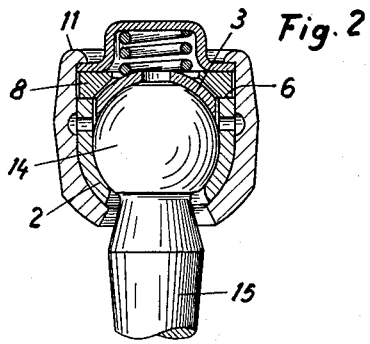
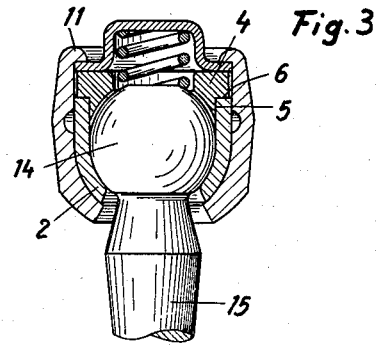
Inventor
JOSEF LATZEN
By Robert H. Jacob
Agent

United States Patent Office 2,718,418
Patented Sept. 20, 1955

2,718,418

BALL AND SOCKET JOINT FOR STEERING RODS OF MOTOR VEHICLES

Josef Latzen, Dusseldorf-Oberkassel, Germany, assignor to A. Ehrenreich & Cie, Dusseldorf-Oberkassel, Germany Application August 15, 1950, Serial No. 179,536

3 Claims. (Cl. 287—90)

My present invention relates to an improved ball and socket joint comprising a bearing shell forming the lower ball support, in particular for steering rods of motor vehicles.

Object of the present invention is to provide a ball and socket joint which, in spite of exact fit of its component parts when mounted, does not require parts having extremely accurate dimensions and which enables a simplified assembly without any fitting work.

Ball and socket joints known heretofore require a great accuracy in the size of their component parts to provide for a smooth motion without any inadmissible play, particularly if the ball and socket joints are to be employed in motor vehicles. These considerable fitting requirements make the manufacture of ball and socket joints rather expensive.

According to the present invention a ball and socket joint is provided with a bearing shell forming the lower ball support of a joint rod. At the side opposite to the joint rod the bearing shell defines a cylindrical portion forming a centering closure head for an elastic counter support of the ball head. This special design eliminates a centering of the joint parts at the side of the closure as the centering of these parts results automatically as they are inserted into the cylindrical part of the lower bearing shell.

The upper shell border may form a supporting shoulder for a ring limiting vertical play. This design enables an additional simplification of the ball and socket joint in so far as the lower bearing shell may be a lining body of comparatively small thickness the border of which forms a supporting shoulder for the ring limiting vertical play. Being thin-walled the shell may be produced to accurate dimensions by simple pressing operations, to size. It will not be necessary to correct any deformations caused by the tempering process before inserting the shell into the housing as the shell regains its exact shape when pressed through the circular orifice of the closure. The inserted shell provides automatically for accurate centering of the joint parts disposed at the side of the closure cap.

The ring limiting vertical play and an upper spacing ring for the closure cap may be formed in one piece in order to reduce the number of components forming the ball and socket joint. The ring limiting vertical play is inserted into the cylindrical upper portion of the lower bearing shell. A special upper counter bearing shell for the ball head may likewise be omitted.

It is also possible to combine the distance ring with the closure cap so that the distance ring is identical with the ring limiting vertical play.

The upper counter bearing of the ball, which is formed as a comparatively thin-walled shell, may be inserted into the cylindrical upper portion of the lower bearing shell, thus enabling production of the upper counter bearing inexpensively by pressing.

The ring limiting vertical play may be performed as a pressed thin-walled annular disc which overlaps the upper counter bearing shell and which is secured by a thin-walled closure cap upon a shoulder formed by the lower bearing shell. Such a design simplifies the production of ball and socket joints as the aforementioned parts can be produced by pressing.

It will be understood that the ball and socket joint according to the present invention will not be limited to steering rods of motor vehicles, but it can also be employed in other steering and moving mechanisms.

By way of example, some preferred embodiments of the present invention are shown in vertical section in the accompanying drawings, wherein Fig. 1 illustrates a ball and socket joint the lower bearing shell of which is formed by a lining body;

Fig. 1a illustrates a ball and socket joint in which the lower bearing shell is formed directly in the housing;

Fig. 2 illustrates an embodiment of the invention in which a special ring is provided to limit vertical play;

Fig. 3 illustrates a further embodiment of the invention providing a spacing ring formed in one piece with a play limiting ring and in which a special counter bearing for the ball head has been omitted;

Fig. 4 illustrates an embodiment of the invention showing a ball and socket joint in which the closure cap and the play limiting ring are formed in one piece, and Fig. 4a illustrates an embodiment in which the play limiting ring is constituted by a thin walled annular disk.

Similar letters refer to similar parts throughout the several views.

Referring now to the figures the lower ball support is formed by dish-shaped bearing surfaces diverging to a cylindrical part at the side of the housing closure. According to Fig. 1a the lower ball support is directly formed by a housing 1, whereas the embodiments shown in the other figures provide a lower bearing shell 2 evolving into a cylindrical part, thus forming a thin-walled lining body. The cylindrical part of the bearing shell serves for a centering head for an upper ball counter support.

As shown in the Figs. 1, 1a, 2, 4 and 4a thin-walled shell 3 is inserted into the cylindrical part of the shell 2, thus forming an upper ball counter support. As to the embodiment shown in Fig. 3 instead of the special shell 3 a spacing ring 4 forming one piece with a ring 5 limiting vertical play of the bearing is inserted into the cylindrical part of the shell 2.

In all figures shown an upper shell border 6 forms a supporting shoulder for the ring 5 limiting vertical play. According to Figs. 1, 1a and Fig. 4 the ring 5 is formed in one piece with a closure cap 7 or 10, whereas the modification shown in Fig. 2 provides a special play limiting ring 8, which acts as a spacing ring. In the embodiment shown in Figs. 1 and 1a the closure cap is secured by a beading 11 and in the embodiment according to Fig. 4 the closure cap is screwed into the housing and provided with a locking ring 12.

In the embodiment shown in Fig. 4a the play limiting ring is formed by a thin-walled annular disc 9 overlapping the upper counter bearing shell 3. The annular disc 9 is secured upon a shoulder formed by the lower bearing shell by means of the thin-walled closure cap 10 which is secured by a beading 11 of the housing. Differing from the embodiments shown in the Figs. 2 and 3, however, the closure cap is provided with an extended part 13 forming an upper spacing ring. The closure caps shown in the Figs. 2, 3 and 4a, may be produced by pressing or drawing. A ball head is marked by 14 and a joint rod by 15.

Various other structural modifications and changes may be made in ball and socket joints redesigned as shown and described, without departing from the spirit and the salient ideas of this invention.

What I claim is:

1. In a ball and socket joint for steering linkages of motor vehicles and the like of the type having a generally spherical ball-headed stud and a surrounding socket structure for receiving the ball head of the stud, the improved socket which comprises a unitary housing having an exterior projection for connection with a steering rod and non-symmetrical interior surfaces with reference to an equatorial plane perpendicular to the axis of the stud and passed transversely through the ball head and housing in assembled relationship, the interior surface of the housing being of concave spherical configuration on one side of said plane, said spherical surface having a common center of curvature with the ball head; the interior surface of the housing on the other side of the aforesaid equatorial plane being cylindrical in configuration and tangent to the spherical surface substantially at its intersection with the equatorial plane; a cap secured to said housing and closing the portion of the socket adjacent to the cylindrical interior region of the housing; a sheet metal shell having a concave, spherical interior surface conforming to the contour of the ball head of the stud and arranged to form a bearing for a portion of said ball head, the periphery of said shell being formed as a portion of a cylinder of less diameter than the diameter of the aforesaid cylindrical portion of the housing whereby said shell may move axially within the cylindrical portion of said housing; and a spring disposed between said shell and the aforesaid cap whereby to urge the cap to remain seated upon the ball head of the stud.

2. In a ball and socket joint for steering linkages of motor vehicles and the like of the type having a generally spherical ball-headed stud and a surrounding socket structure for receiving the ball head of the stud, the improved socket which comprises; a unitary housing having an exterior projection for connection with a steering rod and non-symmetrical interior surfaces with reference to an equatorial plane perpendicular to the axis of the stud and passed transversely through the ball head and housing in assembled relationship, the interior surface of the housing being of concave spherical configuration on one side of said plane, said spherical surface having a common center of curvature with the ball head, said surface forming a direct bearing surface for a portion of the ball head; the interior surface of the housing on the other side of the aforesaid equatorial plane being cylindrical in configuration and tangent to the spherical surface substantially at its intersection with the equatorial plane; a cap secured to said housing and closing the portion of the socket adjacent to the cylindrical interior region of the housing; a sheet metal shell having a concave, spherical interior surface conforming to the contour of the ball head of the stud and arranged to form a bearing for a portion of said ball head, the periphery of said shell being formed as a portion of a cylinder of slightly less diameter than the diameter of the aforesaid cylindrical portion of the housing whereby said shell may move axially within the cylindrical portion of said housing but is confined against transverse movement; and a spring disposed between said shell and the aforesaid cap whereby to urge the cap to remain seated upon the ball head and the ball head to remain seated upon the spherical surface of the housing.

3. A ball and socket joint in accordance with claim 1 wherein a unitary sheet metal liner is arranged in said housing with the exterior surface of the liner in contact and conforming substantially with the interior spherical and cylindrical surfaces of the housing, and the ball head is arranged in direct bearing contact with a portion of the interior surface of the liner.

References Cited in the file of this patent

UNITED STATES PATENTS

| | | |
|---|---|---|
| 2,096,966 | Hufferd | Oct. 26, 1937 |
| 2,236,062 | Katcher | Mar. 25, 1941 |
| 2,516,688 | Flumerfelt | July 25, 1950 |

FOREIGN PATENTS

| | | |
|---|---|---|
| 134,709 | Great Britain | Dec. 4, 1920 |
| 255,833 | Italy | Nov. 14, 1927 |
| 588,622 | Germany | May 12, 1931 |